(12) United States Patent
Ouyang

(10) Patent No.: US 9,236,801 B2
(45) Date of Patent: Jan. 12, 2016

(54) SWITCH MODE POWER SUPPLY, CONTROL CIRCUIT AND ASSOCIATED CONTROL METHOD

(71) Applicant: Chengdu Monolithic Power Systems Co., Ltd., Chengdu (CN)

(72) Inventor: Qian Ouyang, Hangzhou (CN)

(73) Assignee: Chengdu Monolithic Power Systems Co., Ltd., Chengdu (CN)

(*) Notice: Subject to any disclaimer, the term of this patent is extended or adjusted under 35 U.S.C. 154(b) by 56 days.

(21) Appl. No.: 14/102,251

(22) Filed: Dec. 10, 2013

(65) Prior Publication Data

US 2014/0160601 A1 Jun. 12, 2014

(30) Foreign Application Priority Data

Dec. 10, 2012 (CN) .......................... 2012 1 0527709

(51) Int. Cl.
| | |
|---|---|
| H02H 3/00 | (2006.01) |
| H02M 3/158 | (2006.01) |
| H02H 7/12 | (2006.01) |
| H02M 3/156 | (2006.01) |
| H02J 9/00 | (2006.01) |
| H02M 1/00 | (2007.01) |

(52) U.S. Cl.
CPC ............ *H02M 3/158* (2013.01); *H02H 7/1213* (2013.01); *H02M 3/1588* (2013.01); *H02J 9/005* (2013.01); *H02M 3/156* (2013.01); *H02M 2001/0032* (2013.01); *H02M 2001/0058* (2013.01); *Y02B 70/1466* (2013.01); *Y02B 70/1491* (2013.01); *Y02B 70/16* (2013.01)

(58) Field of Classification Search
USPC .................................. 361/18, 86–87
See application file for complete search history.

(56) References Cited

U.S. PATENT DOCUMENTS

| | | | |
|---|---|---|---|
| 8,018,694 B1* | 9/2011 | Wu | 361/18 |
| 8,198,880 B2 | 6/2012 | Ouyang | |
| 8,400,129 B2 | 3/2013 | Ouyang | |
| 2011/0018516 A1* | 1/2011 | Notman et al. | 323/284 |
| 2012/0019225 A1 | 1/2012 | Tsai | |
| 2012/0235664 A1 | 9/2012 | Dong | |
| 2013/0002223 A1 | 1/2013 | Xi | |
| 2013/0207625 A1* | 8/2013 | Futamura | 323/271 |

* cited by examiner

*Primary Examiner* — Danny Nguyen
(74) *Attorney, Agent, or Firm* — Perkins Coie LLP

(57) ABSTRACT

A switch mode power supply having an output terminal configured to provide an output voltage, the switch mode power supply has a first switch, a second switch and a control circuit. The control circuit is configured to provide a first switching control signal to turn ON and turn OFF the first switch, and when the switch mode power supply works in a power saving mode, the first switch is turned ON if a voltage feedback signal is less than a reference voltage and a current flowing through the second switch is less than a bias current.

20 Claims, 5 Drawing Sheets

SWITCH MODE POWER SUPPLY, CONTROL CIRCUIT AND ASSOCIATED CONTROL METHOD

CROSS-REFERENCE TO RELATED APPLICATION(S)

This application claims the benefit of CN application No. 201210527709.8, filed on Dec. 10, 2012, and incorporated herein by reference.

TECHNICAL FIELD

The present invention relates to electrical circuit, more particularly but not exclusively relates to switch mode power supply.

BACKGROUND

With development of electronic technology, many electronic devices such as mobile phone, personal digital assistant (PDA), tablet PC, netbook and ultrabook are widely used. While many electronic devices have to support AOAC (always on and always connected) mode, i.e., standby mode, in which an electronic device is active but draws little current. The standby time period, in another word, how long the electronic device can stay in AOAC mode is critical. As load only draws little current in AOAC mode, overall efficiency at light load is of vital importance.

Switch mode power supply is widely used in electronic devices for power conversion due to their excellent load transient response, high efficiency, small size and easy integration. But quiescent current costs most of power and mainly effects efficiency at light load.

SUMMARY

It is one of the objects of the present invention to provide switch mode power supply, control circuit and associated control method to resolve one or more technical problems.

One embodiment of the present invention discloses a control circuit for a switch mode power supply, the switch mode power supply comprises a first switch and a second switch, wherein the control circuit is configured to turn ON and turn OFF the first switch and the second switch, the switch mode power supply is configured to receive an input voltage and supply an output voltage, and wherein the control circuit comprises: a first input terminal configured to receive a voltage feedback signal representing the output voltage; and an output terminal configured to provide a first switching control signal to turn ON and turn OFF the first switch; and wherein when the switch mode power supply works in a power saving mode, the first switch is turned ON if voltage feedback signal is less than a reference signal and a current flowing through the second switch decreases less than a bias current.

Another embodiment of the present invention discloses a switch mode power supply, wherein the switch mode power supply may comprise a first switch, a second switch and the control circuit described above.

Yet another embodiment of the present invention discloses a control method for a switch mode power supply, the switch mode power supply comprises a first switch, a second switch and a control circuit for turning ON and turning OFF the first switch and the second switch, wherein the control method comprises: providing a zero-crossing signal based on a current flowing through the second switch; turning ON the first switch based on an output voltage of the switch mode power supply when the switch mode power supply works in a normal mode; and turning ON the first switch based on the output voltage of the switch mode power supply and the zero-crossing signal when the switch mode power supply works in a power saving mode.

With embodiments of the present invention, it is flexible to achieve lower quiescent current and higher efficiency at light load.

BRIEF DESCRIPTION OF THE DRAWINGS

Non-limiting and non-exhaustive embodiments are described with reference to the following drawings.

The use of the same reference label in different drawings indicates the same or like components.

DETAILED DESCRIPTION

In the present application, numerous specific details are provided, such as examples of circuits, components, and methods, to provide a thorough understanding of embodiments of the invention. These embodiments are exemplary, not to confine the scope of the invention. Persons of ordinary skill in the art will recognize, however, that the invention can be practiced without one or more of the specific details. In other instances, well-known details are not shown or described to avoid obscuring aspects of the invention. Some phrases are used in some exemplary embodiments. However, the usage of these phrases is not confined to these embodiments.

Several embodiments of the present invention are described below with reference to switch mode power supply, control circuit and associated control method. As used hereinafter, the term "couple" generally refers to multiple ways including a direct connection with an electrical conductor and an indirect connection through intermediate diodes, resistors, capacitors, and/or other intermediaries.

Figure 1:
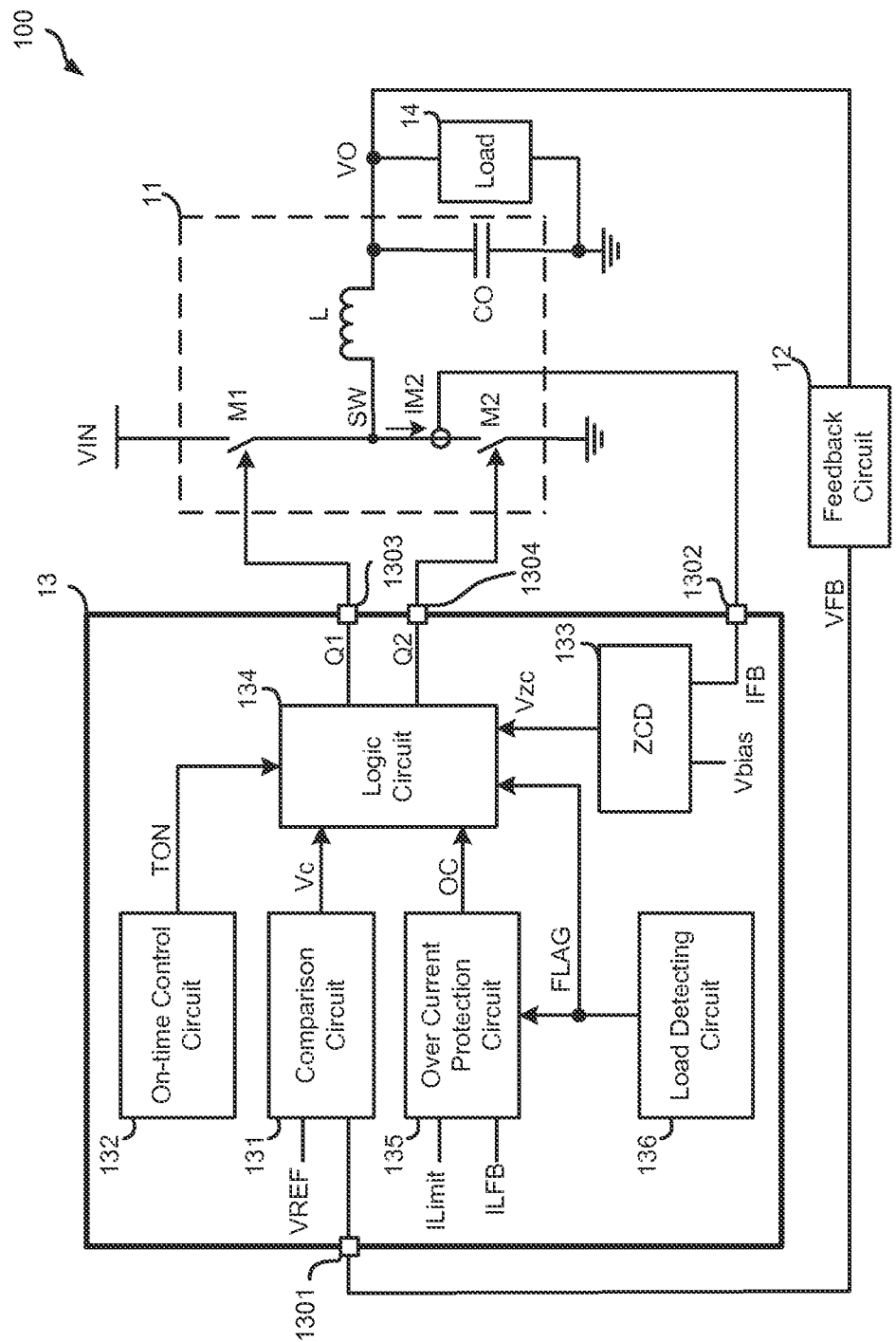
FIG. 1 illustrates a circuit block diagram of a switch mode power supply 100 according to an embodiment of the present invention.

FIG. 1 illustrates a circuit block diagram of a switch mode power supply 100 according to an embodiment of the present invention. Switch mode power supply 100 comprises a power stage 11, a feedback circuit 12 and a control circuit 13.

Power stage 11 comprises a switching circuit comprising a switch M1, a switch M2, and a low pass filter comprising an inductor L and a capacitor CO, wherein switch M2 comprises a synchronous rectifier. Power stage 11 is configured to receive an input voltage VIN, and provide an output voltage VO through the low pass filter via turning ON and OFF the switching circuit. A load 14 is coupled between output voltage VO and a system ground. Power stage 11 may comprise a Direct Current to Direct Current (DC/DC) converter or an Alternating Current to Direct Current (AC/DC) converter.

One of ordinary skill in the art should understand that any suitable topology may be employed, such as step-down converter, step-up converter, and half-bridge converter.

In one embodiment, switch M1 comprises a power switch. Switch M1 may be any suitable controllable semiconductor switching device, such as Metal-Oxide-Semiconductor Field Effect Transistor (MOSFET), Insulated Gate Bipolar Translator (IGBT) and so on. Switch M1 comprises a first terminal, a second terminal and a control terminal, wherein the first terminal is configured to receive input voltage VIN, the control terminal is configured to receive a switching control signal Q1, and switch M1 is turned ON and OFF by switching control signal Q1. Switch M2 may be any suitable controllable semiconductor switching device, such as diode, Metal-Oxide-Semiconductor Field Effect Transistor (MOSFET), Insulated Gate Bipolar Translator (IGBT) and so on. In one embodiment, switch M2 comprises a first terminal, a second terminal and a control terminal, wherein the first terminal of switch M2 is coupled to the second terminal of switch M1 at a node SW, the second terminal of switch M2 is coupled to the system ground, the control terminal of switch M2 is configured to receive a switching control signal Q2, and switch M2 is turned ON and OFF by switching control signal Q2.

Feedback circuit 12 is configured to provide a voltage feedback signal VFB representing output voltage VO. One with ordinary skill in the art should appreciate that feedback circuit 12 may comprise resistor divider, capacitor divider, or any other suitable circuit.

Control circuit 13 is configured to receive voltage feedback signal VFB at an input terminal 1301, receive a current feedback signal IFB at an input terminal 1302 and provide switching control signal Q1 to switch M1 at an output terminal 1303, wherein current feedback signal IFB represents a current IM2 flowing through switch M2. In one embodiment shown in FIG. 1, control circuit 13 comprises a comparison circuit 131, an on-time control circuit 132, a zero-crossing detector 133 and a logic circuit 134. In one embodiment, control circuit 13 is configured to provide switching control signal Q2 at an output terminal 1304 to turn ON and turn OFF switch M2. Control circuit 13 is configured to regulate output voltage VO via turn ON and turn OFF switch M1 and switch M2. Control circuit 13 may be integrated on a chip or may comprise discrete devices. In one embodiment, control circuit 13 comprises both an integrated circuit and discrete devices.

Comparison circuit 131 is configured to receive voltage feedback signal VFB and a reference voltage VREF, and is configured to provide a comparison signal Vc via comparing voltage feedback signal VFB with reference voltage VREF. In one embodiment, when voltage feedback signal VFB is less than reference voltage VREF, comparison signal Vc is effective, e.g., Vc="1". When voltage feedback signal VFB is larger than reference voltage VREF, comparison signal Vc is ineffective, e.g., Vc="0".

On-time control circuit 132 is configured to provide an on-time control signal TON. In one embodiment, on-time control circuit 132 is configured to provide on-time control signal TON to adjust an on-time period ton of switch M1 based on input voltage VIN. In one embodiment, on-time control circuit 132 is configured to provide on-time control signal TON to adjust on-time period ton of switch M1 based on input voltage VIN and output voltage VO. In one embodiment, on-time period ton of switch M1 decreases with increasing of input voltage VIN and increases with increasing of output voltage VO. In one embodiment, on-time period ton of switch M1 is determined by the following equation:

$$ton = VO/(fs*VIN) \quad (1)$$

where fs is a steady state switching frequency of switch mode power supply 100 at full load.

Zero-crossing detector 133 is configured to receive current feedback signal IFB representing current IM2 flowing through switch M2. When current IM2 is recognized decreasing to a certain range, such as less than a bias current, then zero-crossing detector 133 is configured to provide an effective zero-crossing signal Vzc, and switch M2 is configured to be turned OFF. In one embodiment, the bias current may equal to zero ampere, above zero ampere or under zero ampere. In one embodiment, zero-crossing detector 133 is configured to provide zero-crossing signal Vzc via comparing current feedback signal IFB with a bias signal Vbias. In one embodiment, zero-crossing signal Vzc becomes effective when current IM2 is less than or approximately less than zero ampere, and zero-crossing signal Vzc becomes ineffective when current IM2 becomes larger than or approximately larger than zero ampere. In one embodiment, switch M2 comprises an on-resistance RL, and zero-crossing detector 133 is configured to detect current IM2 via testing a drain to source voltage VDS of switch M2.

Logic circuit 134 is configured to receive comparison signal Vc, zero-crossing signal Vzc, a mode control signal FLAG and on-time control signal TON, and is configured to provide switching control signal Q1 to switch M1 and switching control signal Q2 to switch M2. Switch mode power supply 100 is configured to operate in a power saving mode or a normal mode based on mode control signal FLAG. When mode control signal FLAG is effective, switch mode power supply 100 works in the power saving mode, switch M1 is turned ON based on comparison signal Vc and zero-crossing signal Vzc, switch M1 is turned OFF based on on-time control signal TON; and when mode control signal FLAG is ineffective, switch mode power supply 100 works in the normal mode, switch M1 is turned ON only based on comparison signal Vc, i.e., independent with zero-crossing signal Vzc, switch M1 is turned OFF based on on-time control signal TON. In one embodiment, when switch mode power supply works in the power saving mode, logic circuit 134 is configured to provide effective switching control signal Q1 to turn ON switch M1 if voltage feedback signal VFB is less than reference voltage VREF and zero-crossing signal Vzc is effective.

In one embodiment, when switch mode power supply 100 works in the power saving mode, if current IM2 decreases less than the bias current, zero-crossing signal Vzc becomes effective, e.g., Vzc="1". After current IM2 decreases less than the bias current, control circuit 13 is configured to turn ON switch M1 based on comparison signal Vc. An inductor current IL flowing through inductor L is limited to:

$$IL = IL0 + ton*(VIN-VO)/L \quad (2)$$

where IL0 corresponds to the bias current.

As a result, peak value of Inductor current IL is limited when switch mode power supply 100 works in the power saving mode, and an over current limit circuit is not needed in the power saving mode, as a result quiescent current is reduced to improve efficiency of switch mode power supply 100 in the power saving mode.

In one embodiment, mode control signal FLAG is provided by a smart load, such as Central Processing Unit (CPU) and Micro Programmed Control Unit (MCU). Taking an ultrabook as one example, when working at light load, such as in AOAC mode or standby mode, CPU of the ultrabook sends out a command as mode control signal FLAG to switch mode power supply 100, and switch mode power supply 100 transits to the power saving mode accordingly.

Mode control signal FLAG may be provided by switch mode power supply 100. In one embodiment, control circuit 13 further comprises a load condition detecting circuit 136. Load condition detecting circuit 136 is configured to provide mode control signal FLAG via detecting circuit parameters of switch mode power supply 100. In one embodiment, load condition detecting circuit 136 is configured to provide mode control signal FLAG via comparing an output current of switch mode power supply 100 with a current reference. When the output current of switch mode power supply 100 is less than the current reference, switch mode power supply 100 is recognized as working at light load, mode control signal FLAG becomes effective, switch mode power supply 100 transits to the power saving mode, and switch M1 is turned ON based on comparison signal Vc and zero-crossing signal Vzc. When the output current of switch mode power supply 100 is larger than the current reference, switch mode power supply 100 is recognized as working at non-light load, mode control signal FLAG becomes ineffective, switch mode power supply 100 transits to the normal mode, and switch M1 is turned ON based on comparison signal Vc. In another embodiment, load condition detecting circuit 136 is configured to provide mode control signal FLAG via comparing a switching period of switch mode power supply 100 with a period reference. When the switching period of switch mode power supply 100 is larger than the period reference, switch mode power supply 100 is recognized as working at light load, mode control signal FLAG becomes effective, switch mode power supply 100 transits to the power saving mode, and switch M1 is turned ON based on comparison signal Vc and zero-crossing signal Vzc. When the switching period of switch mode power supply 100 is less than the period reference, switch mode power supply 100 is recognized as working at non-light load, mode control signal FLAG becomes ineffective, switch mode power supply 100 transits to the normal mode, and switch M1 is turned ON based on comparison signal Vc.

In one embodiment, control circuit 13 further comprises an over current protection circuit 135. When switch mode power supply 100 works in the normal mode, over current protection circuit 135 is configured to provide an over current protection. In one embodiment, over current protection circuit 135 comprises an enable terminal, configured to receive mode control signal FLAG. When mode control signal FLAG is effective, over current protection circuit 135 is disabled, e.g., over current protection circuit 135 is shut down totally and do not draw any current. When mode control signal is ineffective, over current protection circuit 135 is enabled, over current protection circuit 135 is configured to provide an over current protection signal OC, and control circuit 13 is configured to turn OFF switch M1 based on on-time control signal TON or over current protection signal OC. When switch mode power supply 100 works in the power saving mode, over current protection circuit 135 is shut down to reduce quiescent current and improve efficiency of switch mode power supply 100. In one embodiment, over current protection circuit 135 is configured to receive a current feedback signal ILFB representing inductor current IL, a threshold signal ILimit and mode control signal FLAG, when mode signal FLAG is effective, over current protection circuit 135 stops working, and when mode control signal FLAG is ineffective, over current protection circuit 135 is configured to provide over current protection signal OC via comparing current feedback signal ILFB with threshold signal ILimit. In one embodiment, when current feedback signal ILFB is larger than threshold signal ILimit, over current protection signal OC is effective, e.g., OC="1", logic circuit 134 is configured to provide ineffective switching control signal Q1 to turn OFF switch M1. In one embodiment, current feedback signal ILFB may be replaced by current feedback signal IFB representing the current flowing through switch M2.

Figure 2:
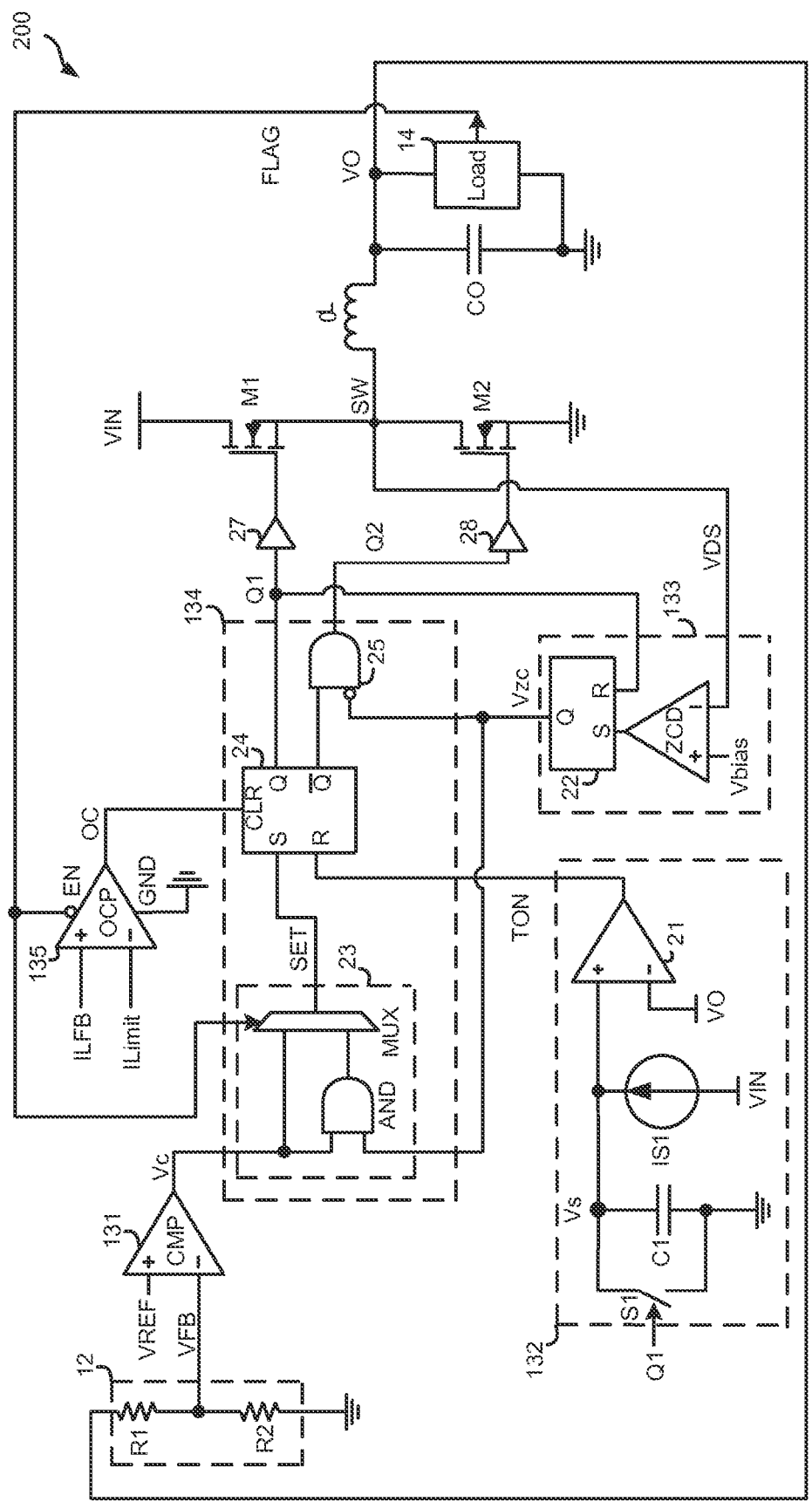
FIG. 2 schematically illustrates a circuit diagram of a switch mode power supply 200 according to an embodiment of the present invention.

FIG. 2 schematically illustrates a circuit diagram of a switch mode power supply 200 according to an embodiment of the present invention. Switch mode power supply 200 employs step-down converter as one example. Switch mode power supply 200 comprises switch M1, switch M2, inductor L and capacitor CO. Switch mode power supply 200 is configured to convert input voltage VIN to output voltage VO via turning ON and turning OFF switch M1 and switch M2. One terminal of switch M1 is coupled to input voltage VIN, the other terminal of switch M1 is coupled to one terminal of switch M2, and the other terminal of switch M2 is coupled to the system ground. One terminal of inductor L is coupled to common node SW of switch M1 and switch M2, capacitor CO is coupled between the other terminal of inductor L and the system ground. A voltage across capacitor CO is output voltage VO.

Continuing with FIG. 2, load 14 is coupled to capacitor CO in parallel. In the embodiment shown in FIG. 2, load 14 is configured to provide mode control signal FLAG. Load 14 may be a smart unit such as Central Processing Unit (CPU), Micro programmed Control Unit (MCU) and so on. When in AOAC mode or standby mode, Load 14 is configured to provide effective mode control signal FLAG, and switch mode power supply 200 is configured to transit to the power saving mode.

Switch mode power supply 200 further comprises feedback circuit 12, comparison circuit 131, on-time control circuit 132, zero-crossing detector 133, logic circuit 134 and over current protection circuit 135.

As shown in FIG. 2, feedback circuit 12 is a voltage divider comprising a resistor R1 and a resistor R2, wherein one terminal of resistor R1 is coupled to one terminal of capacitor CO, i.e., an output terminal of switch mode power supply 200, the other terminal of resistor R1 is coupled to one terminal of resistor R2, and the other terminal of resistor R2 is coupled to the other terminal of capacitor CO, i.e., the system ground, a common node of resistor R1 and resistor R2 is configured to provide voltage feedback signal VFB.

Comparison circuit 131 comprises a comparator CMP. Comparator CMP comprises a non-inverting terminal, an inverting terminal and an output terminal, wherein the non-inverting terminal is configured to receive reference voltage VREF, the inverting terminal is configured to receive voltage feedback signal VFB, and the output terminal is configured to provide comparison signal Vc via comparing voltage feedback signal VFB with reference voltage VREF. Reference voltage VREF may be constant or variable. In one embodiment, reference voltage VREF is provided through a digital to analog device (DAC). In one embodiment, the non-inverting terminal of comparator CMP may be coupled to reference voltage VREF and a compensation signal. In another embodiment, the inverting terminal of comparator CMP may be coupled to voltage feedback signal VFB and the compensation signal.

On-time control circuit 132 is configured to receive input voltage VIN, output voltage VO and switching control signal Q1, and is configured to provide on-time control signal TON. In the embodiment shown in FIG. 2, on-time control circuit 132 comprises a current source IS1, a capacitor C1, a controlling switch S1 and a comparator 21. Current source IS1 comprises a first terminal and a second terminal, wherein the first terminal of current source IS1 is configured to receive input voltage VIN, the second terminal of current source IS1 is coupled to one terminal of capacitor C1 to provide a charging current, and the other terminal of capacitor C1 is coupled to the system ground. Current source IS1 is configured to charge capacitor C1 by the charging current. In one embodiment, the charging current varies with input voltage VIN, e.g., increases with increasing of input voltage VIN. Controlling switch S1 comprises a first terminal, a second terminal and a control terminal, wherein the first terminal of controlling switch S1 is coupled to a common node of capacitor C1 and current source IS1, the second terminal of controlling switch S1 is coupled to the other terminal of capacitor C1, and the control terminal of controlling switch S1 is configured to receive switching control signal Q1. In one embodiment, when switching control signal Q1 is effective, e.g., high voltage level, controlling switch S1 is turned OFF, capacitor C1 is charged by current source IS1, and the voltage across capacitor C1 increases gradually; when switching control signal Q1 is ineffective, e.g., low voltage level, controlling switch S1 is turned ON, capacitor C1 is discharged via controlling switch S1, the voltage across capacitor C1 decreases. In one embodiment, a voltage Vs at the common node of capacitor C1 and current source IS1 represents the voltage across capacitor C1. Comparator 21 comprises a non-inverting terminal, an inverting terminal and an output terminal, wherein the non-inverting terminal of comparator 21 is configured to receive voltage Vs, the inverting terminal of comparator 21 is configured to receive output voltage VO, and the output terminal of comparator 21 is configured to provide on-time control signal TON via comparing voltage Vs with output voltage VO. In another embodiment, comparator 21 is configured to provide on-time control signal TON via comparing voltage Vs with a constant reference, e.g., 0.4V.

Zero-crossing detector 133 comprises a zero-crossing detecting comparator ZCD. Zero-crossing detecting comparator ZCD comprises a non-inverting terminal configured to receive bias signal Vbias, an inverting terminal coupled to drain of switch M2 to receive drain to source voltage VDS and an output terminal configured to provide zero-crossing signal Vzc. In one embodiment, when drain to source voltage VDS of switch M2 is less than bias signal Vbias, zero-crossing signal Vzc is effective to turn OFF switch M2 through logic circuit 134.

In one embodiment, zero-crossing detector 133 further comprises a flip-flop 22. The output terminal of zero-crossing detecting comparator ZCD is configured to provide zero-crossing signal Vzc through flip-flop 22. Flip-flop 22 comprises a set terminal S coupled to the output terminal of zero-crossing detecting comparator ZCD, a reset terminal R configured to receive switching control signal Q1, and an output terminal Q configured to provide zero-crossing signal Vzc based on drain to source voltage VDS of switch M2, bias signal Vbias and switching control signal Q1. When drain to source voltage VDS of switch M2 is less than bias signal Vbias, flip-flop 22 is set to provide effective zero-crossing signal Vzc, e.g., Vzc="1", and when switching control signal Q1 is effective, flip-flop 22 is reset, and zero-crossing signal Vzc becomes ineffective, e.g., Vzc="0". Flip-flop 22 is employed to avoid oscillation of zero-crossing signal Vzc, reliability and accuracy of zero-crossing detecting is improved. One of ordinary skill in the art should also understand that any other suitable circuit such as hysteresis circuit may also be employed to improve reliability of zero-crossing detecting without detracting from the merits of the present invention. In one embodiment, when drain to source voltage VDS of switch M2 is less than a bias signal Vbias1, zero-crossing signal Vzc is effective and when drain to source voltage VDS of switch M2 is larger than a bias signal Vbias2, zero-crossing signal Vzc is ineffective, and wherein bias signal Vbias1 is less than bias signal Vbias2.

Logic circuit 134 is configured to receive comparison signal Vc, zero-crossing signal Vzc, on-time control signal TON, mode control signal FLAG and over current protection signal OC, and is configured to provide switching control signal Q1 to switch M1 and switching control signal Q2 to switch M2. In one embodiment, logic circuit 134 is configured to reset switching control signal Q1 based on on-time control signal TON to turn OFF switch M1 and turn ON switch M2. In one embodiment, when drain to source voltage VDS of switch M2 is less than bias signal Vbias, zero-crossing signal Vzc is effective to turn OFF switch M2.

In one embodiment, when mode control signal FLAG is effective, e.g., FLAG="1", logic circuit 134 is configured to set switching control signal Q1 effective to turn ON switch M1 and turn OFF switch M2 based on comparison signal Vc and zero-crossing signal Vzc and when voltage feedback signal VFB is less than reference voltage VREF and drain to source voltage VDS of switch M2 is less than bias signal Vbias, i.e., when comparison signal Vc and zero-crossing signal Vzc are both effective, switching control signal Q1 is effective to turn ON switch M1 and turn OFF switch M2. In one embodiment, when mode control signal FLAG is ineffective, e.g., FLAG="0", logic circuit 134 is configured to set switching control signal Q1 effective to turn ON switch M1 and turn OFF switch M2 based on comparison signal Vc, and when voltage feedback signal VFB is less than reference voltage VREF, switching control signal Q1 is effective to turn ON switch M1 and turn OFF switch M2.

In the embodiment shown in FIG. 2, logic circuit 134 comprises a logic unit 23, a flip-flop 24 and a logic unit 25. Logic unit 23 is configured to receive comparison signal Vc, zero-crossing signal Vzc and mode control signal FLAG, and is configured to provide a setting signal SET. When mode control signal FLAG is effective, logic unit 23 is configured to provide setting signal SET based on comparison signal Vc and zero-crossing signal Vzc, and when mode control signal FLAG is ineffective, logic unit 23 is configured to provide setting signal SET based on comparison signal Vc. In one embodiment, logic unit 23 comprises an AND gate and a multiplexer MUX. AND gate comprises a first input terminal, a second input terminal and an output terminal, wherein the first input terminal is configured to receive comparison signal Vc, the second input terminal is configured to receive zero-crossing signal Vzc. Multiplexer MUX comprises a first input terminal, a second input terminal, a control terminal and an output terminal, wherein the first input terminal is configured to receive comparison signal Vc, the second input terminal is coupled to the output terminal of AND gate, the control terminal is configured to receive mode control signal FLAG, and the output terminal is configured to provide setting signal SET. In one embodiment, when mode control signal FLAG is effective, e.g., FLAG="1", multiplexer MUX is configured to choose a signal at the output terminal of AND gate as setting signal SET, e.g., when comparison signal Vc and zero-crossing signal Vzc are both effective, e.g., Vc="1" and Vzc="1", then setting signal SET is effective, e.g., SET="1". In one embodiment, when mode control signal FLAG is ineffective, e.g., FLAG="0", multiplexer MUX is configured to choose comparison signal Vc as setting signal SET.

Flip-flop 24 comprises a set terminal S, a reset terminal R, an output terminal Q and an output terminal /Q, wherein set terminal S is coupled to the output terminal of logic unit 23 to receive setting signal SET, reset terminal R is coupled to the output terminal of on-time control circuit 132 to receive on-time control signal TON, output terminal Q is configured to provide switching control signal Q1 to switch M1, and output terminal /Q is configured to provide switching control signal Q2 to switch M2 through logic unit 25. In one embodiment, a signal at output terminal /Q has opposite phase with switching control signal Q1. In the embodiment shown in FIG. 2, flip-flop 24 further comprises a clear terminal CLR configured to receive over current protection signal OC. When over current protection signal OC is effective, e.g., OC="1", flip-flop 24 is configured to provide an ineffective switching control signal Q1 to turn OFF switch M1. Logic unit 25 is configured to provide switching control signal Q2 based on the signal at output terminal /Q of flip-flip 24 and zero-crossing signal Vzc. When zero-crossing signal Vzc is effective, switching control signal Q2 is ineffective to turn OFF switch M2. In one embodiment, logic unit 25 comprises an AND gate. Logic unit 25 comprises a first input terminal, a second input terminal, and an output terminal, wherein the first input terminal is coupled to the output terminal /Q of flip-flop 24, the second input terminal is coupled to zero-crossing signal Vzc through a NOT gate, and the output terminal is configured to provide switching control signal Q2 to turn ON and turn OFF switch M2.

Over current protection circuit 135 comprises an over current comparator OCP. Over current comparator OCP comprises a non-inverting terminal, an inverting terminal, an enable terminal EN and an output terminal, wherein the inverting terminal is configured to receive threshold signal ILimit, the non-inverting terminal is configured to receive current feedback signal ILFB, the enable terminal EN is configured to receive mode control signal FLAG, and the output terminal is configured to provide over current protection signal OC. In one embodiment, when mode control signal FLAG is effective, e.g., FLAG="1", over current comparator OCP is disabled, and over current protection signal OC keeps ineffective e.g., low voltage level, or high impedance. In one embodiment, when mode control signal FLAG is ineffective, e.g., FLAG="0", over current comparator OCP is enabled to provide over current protection signal OC via comparing feedback signal ILFB with threshold signal ILimit, when feedback signal ILFB is larger than threshold signal ILimit, over current protection signal OC is effective, e.g., high voltage level.

Figure 3:
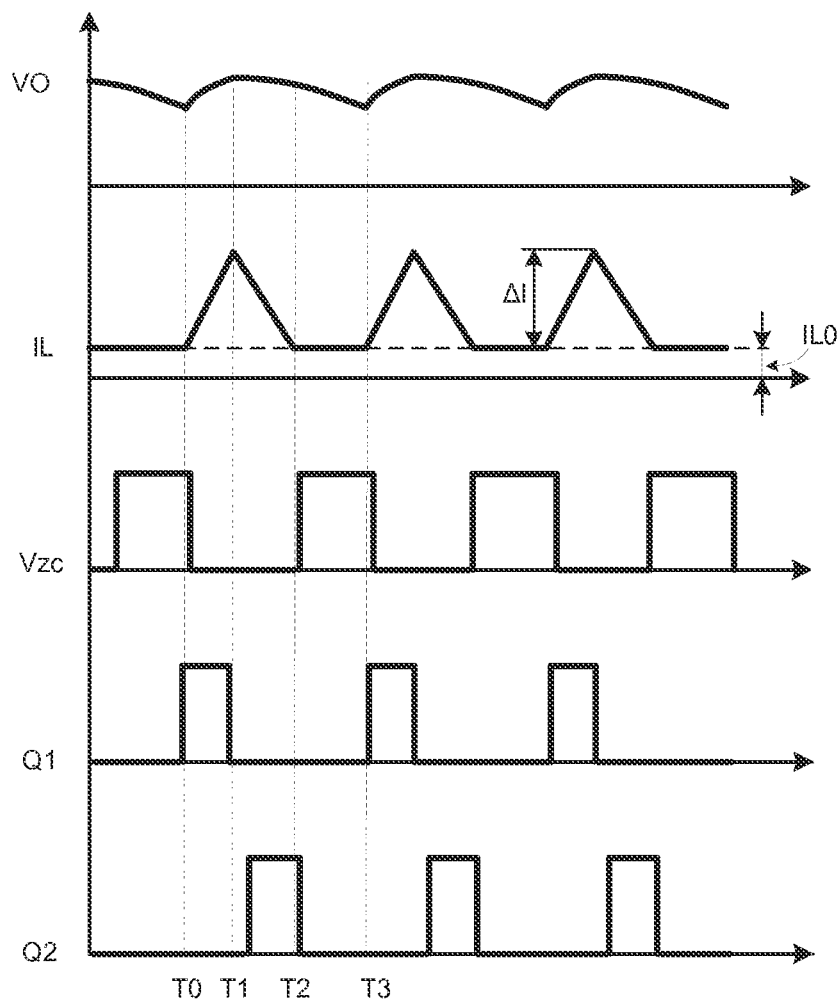
FIG. 3 shows waveforms of switch mode power supply 200 when works in a power saving mode normally according to an embodiment of the present invention.

FIG. 3 shows waveforms of switch mode power supply 200 when works in the power saving mode normally according to an embodiment of the present invention. Waveforms shown in FIG. 3 are output voltage VO, inductor current IL, zero-crossing signal Vzc, switching control signal Q1 and switching control signal Q2.

At time T0, voltage feedback signal VFB is less than reference voltage VREF because of decreasing of output voltage VO, and switching control signal Q1 becomes effective, e.g., Q1="1", to turn ON switch M1 until an on-time period ton expires. Inductor current IL increases gradually during switch M1 is turned ON. At time T1, switching control signal Q1 becomes ineffective, Q1="0", switch M1 is turned OFF, inductor current IL decreases gradually, and then switching control signal Q2 becomes effective, Q2="1", to turn ON switch M2. In one embodiment, a dead-time is provided between on times of switch M1 and switch M2 to avoid damage caused by shoot-through of switch M1 and switch M2. In one example, when switching control signal Q1 becomes ineffective, switching control signal Q2 becomes effective after a delay time period, such as 200 ns.

At time T2, inductor current IL decreases to bias current IL0, and then zero-crossing signal Vzc becomes effective, i.e., high voltage level. In one embodiment, bias current IL0 equals to zero ampere. In other embodiments, bias current IL0 may be larger or less than zero ampere. At time T3, zero-crossing signal Vzc still keeps effective, i.e., high voltage level, voltage feedback signal VFB is less than reference voltage VREF, and then switching control signal Q1 becomes effective, e.g., Q1="1", to turn ON switch M1. Zero-crossing signal Vzc keeps high voltage level until inductor current IL increasing larger than bias current IL0 after time T3.

In the embodiment shown in FIG. 3, inductor current IL at the power saving mode is limited to:

$$IL=IL0+\Delta I=IL0+ton*(VIN-VO)/L \qquad (3)$$

where on-time period ton of switch M1 is determined by equation 1, and on-time period ton is basically constant when with constant input voltage VIN and constant output voltage VO. As a result, peak value of inductor current IL is controllable due to on-time period ton and bias current IL0 are both controllable.

Figure 4:
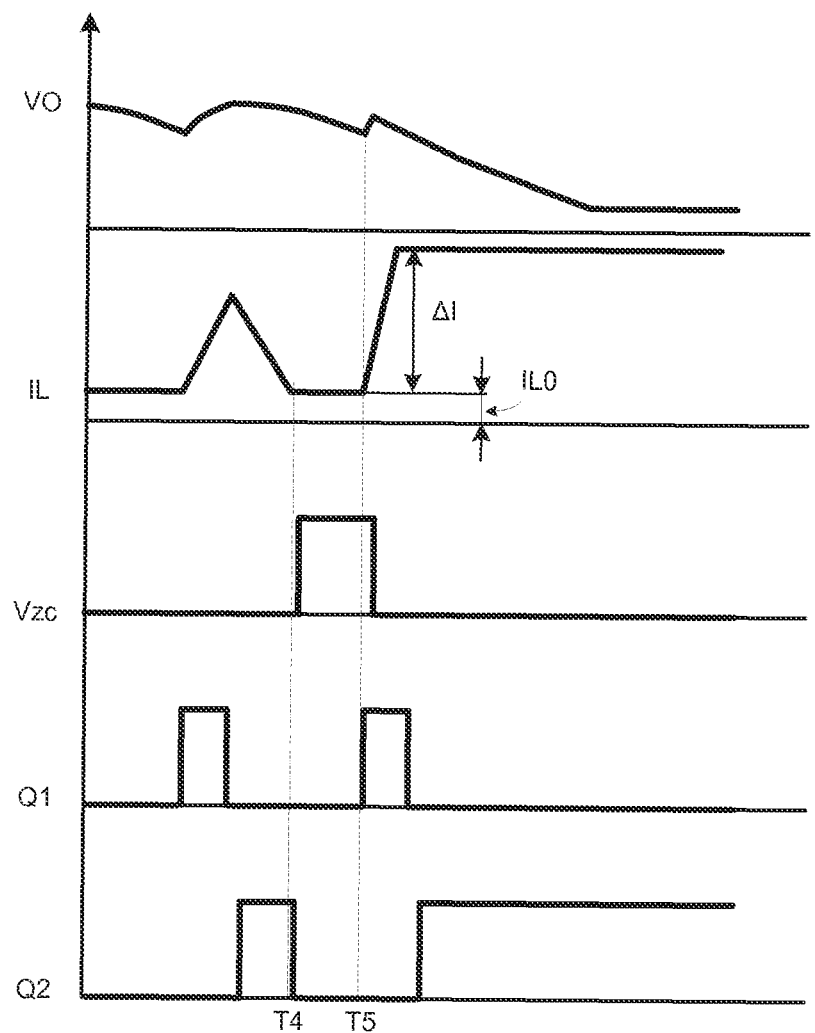
FIG. 4 shows waveforms of switch mode power supply 200 when works in the power saving mode with short circuit or over current condition according to an embodiment of the present invention.

FIG. 4 shows waveforms of switch mode power supply 200 when works in the power saving mode with short circuit or over current condition according to an embodiment of the present invention. Waveforms shown in FIG. 4 are output voltage VO, inductor current IL, zero-crossing signal Vzc, switching control signal Q1 and switching control signal Q2.

At time T4, inductor current IL decreases to bias current IL0, zero-crossing detector 133 is configured to provide effective zero-crossing signal Vzc, e.g., Vzc="1". At time T5, zero-crossing signal Vzc still keeps high voltage level, output voltage VO decreases quickly because of short circuit or over current condition, voltage feedback signal VFB is less than reference voltage VREF, and then switching control signal Q1 becomes effective (Q1="1") to turn ON switch M1 until on-time period ton expires. When switch M1 is turned ON, inductor current IL increases quickly and zero-crossing signal Vzc is reset to low voltage level, wherein variation of inductor current ΔIL is:

$$\Delta IL=ton*(VIN-VO)/L \qquad (4)$$

where on-time period ton is determined by equation 1, which keeps constant when input voltage VIN and output voltage VO are both constant. As a result, variation of inductor current ΔIL is controllable even without any over current protection circuit.

Figure 5:
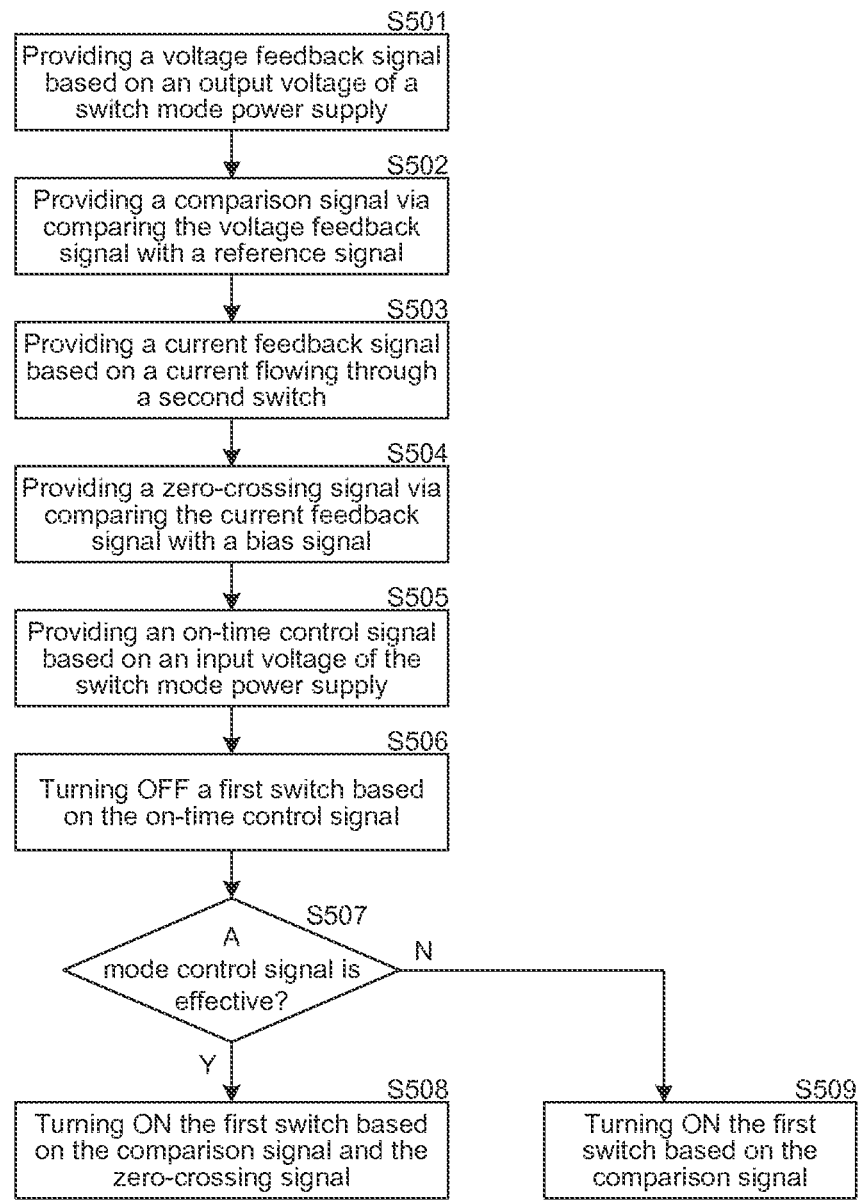
FIG. 5 shows a flow chart illustrating a control method with reference to a switch mode power supply according to an embodiment of the present invention.

FIG. 5 shows a flow chart illustrating a control method with reference to a switch mode power supply according to an embodiment of the present invention. The switch mode power supply comprises a first switch, a second switch and a control circuit configured to turn ON and turn OFF the first switch and the second switch. The control method comprises steps S501-S509.

In step S501, providing a voltage feedback signal based on an output voltage of the switch mode power supply.

In step S502, providing a comparison signal via comparing the voltage feedback signal with a reference voltage.

In step S503, providing a current feedback signal based on a current flowing through the second switch.

In step S504, providing a zero-crossing signal via comparing the current feedback signal with a bias signal.

In step S505, providing an on-time control signal based on an input voltage of the switch mode power supply.

In step S506, turning OFF the first switch based on the on-time control signal.

In step S507, judging if a mode control signal is effective.

When the mode control signal is effective, go into step S508. In step S508, turning ON the first switch based on the comparison signal and the zero-crossing signal. When the mode control signal is ineffective, go into step S509, turning ON the first switch based on the comparison signal.

In one embodiment, the control method further comprises generating an over current protection signal and providing an over current protection when mode control signal is ineffective. When mode control signal is effective, the first switch is turned OFF based on the on-time control signal, and when mode control signal is ineffective, the first switch is turned OFF based on the on-time control signal or the over current protection signal.

In one embodiment, the mode control signal is provided by a load, e.g., CPU of an ultrabook. In another embodiment, the mode control signal is provided by the switch mode power supply itself, e.g., providing the mode control signal based on an output current or a switching period of the switch mode power supply. In one embodiment, when the output current is less than a reference current, the mode control signal becomes effective, and when the output current is larger than the reference current, the mode control signal becomes ineffective. In one embodiment, when the switching period of the switch mode power supply is larger than a reference period, the mode control signal becomes effective, and when the switching period of the switch mode power supply is less than the reference period, the mode control signal becomes ineffective.

Note that in the flow chart described above, the box functions may also be implemented with different order as shown in FIG. 5. For example, two successive box functions may be executed meanwhile, or sometimes the box functions may be executed in a reverse order.

While various embodiments have been described above, it should be understood that they have been presented by way of example only, and not limitation. Thus, the breadth and scope of a preferred embodiment should not be limited by any of the above-described exemplary embodiments, but should be defined only in accordance with the following claims and their equivalents.

I claim:

1. A control circuit for controlling a switch mode power supply, the switch mode power supply having a first switch with a control terminal, a second switch, and an output terminal configured to provide an output voltage, wherein the control circuit comprising:
    an input terminal, configured to receive a voltage feedback signal representing the output voltage;
    an output terminal, configured to provide a first switching control signal to the control terminal of the first switch to turn ON and turn OFF the first switch; and
    a zero-crossing detector, having an output terminal configured to provide a zero-crossing signal, wherein the zero-crossing signal becomes effective when a current flowing through the second switch is less than a bias current, and the zero-crossing signal becomes ineffective when the current flowing through the second switch is larger than the bias current; and wherein
    when the switch mode power supply works in a power saving mode, the control circuit is configured to turn ON the first switch if the voltage feedback signal is less than a reference voltage and the zero-crossing signal is effective; and
    when the switch mode power supply works in a normal mode, the control circuit is configured to turn ON the first switch if the voltage feedback signal is less than the reference voltage.

2. The control circuit of claim 1, wherein the control circuit further comprising an over current protection circuit, wherein the over current protection circuit is shut down when the switch mode power supply works in the power saving mode, and the over current protection circuit is configured to provide an over current protection when the switch mode power supply works in the normal mode.

3. The control circuit of claim 1, wherein the control circuit further comprising:
    a comparison circuit, having a first input terminal, a second input terminal and an output terminal, wherein the first input terminal of the comparison circuit is configured to receive the voltage feedback signal, the second input terminal of the comparison circuit is configured to receive the reference voltage, and the output terminal of the comparison circuit is configured to provide a comparison signal via comparing the voltage feedback signal with the reference voltage;
    an on-time control circuit, having an output terminal configured to provide an on-time control signal; and
    a logic circuit, having a first input terminal, a second input terminal, a third input terminal, a fourth input terminal and an output terminal, wherein the first input terminal of the logic circuit is configured to receive the comparison signal, the second input terminal of the logic circuit is configured to receive the on-time control signal, the third input terminal of the logic circuit is configured to receive the zero-crossing signal, the fourth input terminal of the logic circuit is configured to receive a mode control signal, the output terminal of the logic circuit is configured to provide the first switching control signal based on the comparison signal and the zero-crossing signal when the mode control signal is in a first state, and the output terminal of the logic circuit is configured to provide the first switching control signal based on the comparison signal when the mode control signal is in a second state.

4. The control circuit of claim 3, wherein the logic circuit comprising:
    a first logic unit, having a first input terminal, a second input terminal, a third input terminal and an output terminal, wherein the first input terminal of the first logic unit is configured to receive the comparison signal, the second input terminal of the first logic unit is configured to receive the zero-crossing signal, the third input terminal of the first logic unit is configured to receive the mode control signal, wherein the output terminal of the first logic unit is configured to provide a setting signal based on the comparison signal and the zero-crossing signal when the mode control signal is in the first state, and the output terminal of the first logic unit is configured to provide the setting signal based on the comparison signal when the mode control signal is in the second state; and
    a first flip-flop, having a set terminal, a reset terminal, a first output terminal and a second output terminal, wherein the set terminal of the first flip-flop is coupled to the output terminal of the first logic unit to receive the setting signal, the reset terminal of the first flip-flop is coupled to the output terminal of the on-time control circuit to receive the on-time control signal, and the first output terminal of the first flip-flop is configured to provide the first switching control signal.

5. The control circuit of claim 4, wherein the logic circuit further comprising a second logic unit, the second logic unit having a first input terminal, a second input terminal, and an output terminal, wherein the first input terminal of the second logic unit is coupled to the second output terminal of the first flip-flop, the second input terminal of the second logic unit is coupled to the output terminal of the zero-crossing detector, the output terminal of the second logic unit is configured to provide a second switching control signal to turn ON and turn OFF the second switch.

6. The control circuit of claim 4, wherein the first logic unit comprising:
   an AND gate, having a first input terminal, a second input terminal and an output terminal, wherein the first input terminal of the AND gate is configured to receive the comparison signal, the second input terminal of the AND gate is configured to receive the zero-crossing signal;
   a multiplexer, having a first input terminal, a second input terminal, a control terminal and an output terminal, wherein the first input terminal of the multiplexer is coupled to the output terminal of the AND gate, the second input terminal of the multiplexer is configured to receive the comparison signal, the control terminal of the multiplexer is configured to receive the mode control signal, and the output terminal is configured to provide the setting signal.

7. The control circuit of claim 3, wherein the zero-crossing detector further comprising:
   a comparator, having a first input terminal, a second input terminal and an output terminal, wherein the first input terminal of the comparator is configured to receive a current feedback signal representing the current flowing through the second switch, the second input terminal of the comparator is configured to receive a bias signal; and
   a second flip-flop, having a set terminal, a reset terminal and an output terminal, wherein the set terminal of the second flip-flop is coupled to the output terminal of the comparator, the reset terminal of the second flip-flop is coupled to the output terminal of the logic circuit, and the output terminal of the second flip-flop is configured to provide the zero-crossing signal.

8. The control circuit of claim 3, wherein the control circuit further comprising an over current protection circuit, the over current protection circuit having a first input terminal, a second input terminal, an enable terminal and an output terminal, wherein the first input terminal of the over current protection circuit is configured to receive a current feedback signal representing the current flowing through the second switch, the second input terminal of the over current protection circuit is configured to receive a threshold signal, the enable terminal of the over current protection circuit is configured to receive the mode control signal, and the output terminal of the over current protection circuit is configured to provide an over current protection signal via comparing the current feedback signal with the threshold signal when the mode control signal is in the second state.

9. The control circuit of claim 1, wherein the zero-crossing detector comprising a comparator, the comparator having a first input terminal, a second input terminal and an output terminal, wherein the first input terminal of the comparator is configured to receive a current feedback signal representing the current flowing through the second switch, the second input terminal of the comparator is configured to receive a bias signal, and the output terminal of the comparator is configured to provide the zero-crossing signal via comparing the current feedback signal with the bias signal.

10. A switch mode power supply, having an input terminal and an output terminal configured to provide an output voltage, wherein the switch mode power supply comprising:
   a first switch, having a first terminal, a second terminal and a control terminal, wherein the first terminal of the first switch is coupled to the input terminal of the switch mode power supply;
   a second switch, having a first terminal, a second terminal and a control terminal, wherein the first terminal of the second switch is coupled to the second terminal of the first switch, the second terminal of the second switch is coupled to a system ground; and
   a control circuit, configured to receive a voltage feedback signal representing the output voltage, and provide a first switching control signal to the control terminal of the first switch and a second switching control signal to the control terminal of the second switch; and wherein
   when the switch mode power supply works in a power saving mode, the control circuit is configured to turn ON the first switch if the voltage feedback signal is less than a reference voltage and a current flowing through the second switch is less than a bias current; and
   when the switch mode power supply works in a normal mode, the control circuit is configured to turn ON the first switch if the voltage feedback signal is less than the reference voltage.

11. The switch mode power supply of claim 10, wherein the switch mode power supply further comprising:
   an inductor, having a first terminal and a second terminal, wherein the first terminal of the inductor is coupled to the second terminal of the first switch and the first terminal of the second switch; and
   a capacitor, having a first terminal and a second terminal, wherein the first terminal of the capacitor is coupled to the second terminal of the inductor, and the second terminal of the capacitor is coupled to the system ground.

12. The switch mode power supply of claim 10, wherein the control circuit further comprising an over current protection circuit, wherein the over current protection circuit is configured to provide an over current protection when the switch mode power supply works in the normal mode, and the over current protection circuit is shut down when the switch mode power supply works in the power saving mode.

13. The switch mode power supply of claim 10, wherein the control circuit further comprising:
   a comparison circuit, having a first input terminal, a second input terminal and an output terminal, wherein the first input terminal of the comparison circuit is configured to receive the voltage feedback signal, the second input terminal of the comparison circuit is configured to receive the reference voltage, and the output terminal of the comparison circuit is configured to provide a comparison signal via comparing the voltage feedback signal with the reference voltage;
   an on-time control circuit, configured to provide an on-time control signal, the control circuit is configured to turn OFF the first switch based on the on-time control signal;
   a zero-crossing detector, having an output terminal configured to provide a zero-crossing signal, wherein the zero-crossing signal becomes effective when the current flowing through the second switch is less than the bias current, and the zero-crossing signal becomes ineffective when the current flowing through the second switch is larger than the bias current; and
   a logic circuit, having a first input terminal, a second input terminal, a third input terminal, a fourth input terminal and an output terminal, wherein the first input terminal of the logic circuit is configured to receive the comparison signal, the second input terminal of the logic circuit is configured to receive the on-time control signal, the third input terminal of the logic circuit is configured to receive the zero-crossing signal, the fourth input terminal of the logic circuit is configured to receive a mode control signal, the output terminal of the logic circuit is configured to provide the first switching control signal based on the comparison signal and the zero-crossing signal when the mode control signal is in a first state, and the output terminal of the logic circuit is configured to provide the first switching control signal based on the comparison signal when the mode control signal is in a second state.

14. The switch mode power supply of claim 13, wherein the zero-crossing detector comprising a comparator, having a first input terminal, a second input terminal and an output terminal, wherein the first input terminal of the comparator is configured to receive a current feedback signal, the second input of the comparator is configured to receive a bias signal, and the output terminal of the comparator is configured to provide the zero-crossing signal via comparing the current feedback signal with the bias signal.

15. The switch mode power supply of claim 13, wherein the logic circuit comprising:
   a logic unit, having a first input terminal, a second input terminal, a third input terminal and an output terminal, wherein the first input terminal of the logic unit is configured to receive the comparison signal, the second input terminal of the logic unit is configured to receive the zero-crossing signal, the third input terminal of the logic unit is configured to receive the mode control signal, and the output terminal of the logic unit is configured to provide a setting signal; and
   a flip-flop, having a set terminal, a reset terminal and an output terminal, wherein the set terminal of the flip-flop is coupled to the output terminal of the logic unit, the reset terminal of the flip-flop is coupled to the output terminal of the on-time control circuit, and the output terminal of the flip-flop is coupled to the control terminal of the first switch to provide the first switching control signal.

16. A control method for a switch mode power supply, the switch mode power supply having a first switch, a second switch, and an output terminal configured to provide an output voltage, the control method comprising:
   providing a voltage feedback signal based on the output voltage of the switch mode power supply;
   providing a comparison signal via comparing the voltage feedback signal with a reference voltage;
   providing a zero-crossing signal based on a current flowing through the second switch;
   providing an on-time control signal to control an on-time period of the first switch; and
   turning OFF the first switch based on the on-time control signal; and wherein
   when the switch mode power supply works in a normal mode, turning ON the first switch based on the comparison signal, wherein the first switch is turned ON if the voltage feedback signal is less than the reference voltage; and
   when the switch mode power supply works in a power saving mode, turning ON the first switch based on the comparison signal and the zero-crossing signal, wherein the first switch is turned ON if the voltage feedback signal is less than the reference voltage and the current flowing through the second switch is less than a bias current.

17. The control method of claim 16, wherein the zero-crossing signal becomes effective when the current flowing through the second switch is less than the bias current, and the zero-crossing signal becomes ineffective when the current flowing through the second switch is larger than the bias current.

18. The control method of claim 16, further comprising providing the zero-crossing signal via comparing a current feedback signal representing the current flowing through the second switch with the bias current.

19. The control method of claim 16, further comprising providing an over current protection when the switch mode power supply works in the normal mode, and stopping providing the over current protection when the switch mode power supply works in the power saving mode.

20. The control method of claim 16, further comprising:
   when the switch mode power supply works in the normal mode, turning OFF the first switch based on the on-time control signal or an over current protection signal; and
   when the switch mode power supply works in the power saving mode, turning OFF the first switch based on the on-time control signal.

* * * * *